United States Patent
Kurita et al.

(10) Patent No.: US 12,479,978 B2
(45) Date of Patent: Nov. 25, 2025

(54) COMPOSITE OXIDE PARTICLE MATERIAL, METHOD FOR PRODUCING SAME, FILLER, FILLER-CONTAINING SLURRY COMPOSITION, AND FILLER-CONTAINING RESIN COMPOSITION

(71) Applicant: ADMATECHS CO., LTD., Miyoshi (JP)

(72) Inventors: Keisuke Kurita, Miyoshi (JP); Nobutaka Tomita, Miyoshi (JP); Yuki Arai, Miyoshi (JP)

(73) Assignee: ADMATECHS CO., LTD., Miyoshi (JP)

(*) Notice: Subject to any disclaimer, the term of this patent is extended or adjusted under 35 U.S.C. 154(b) by 0 days.

(21) Appl. No.: 18/790,034

(22) Filed: Jul. 31, 2024

(65) Prior Publication Data
US 2024/0392110 A1   Nov. 28, 2024

Related U.S. Application Data

(63) Continuation of application No. PCT/JP2022/008048, filed on Feb. 25, 2022.

(30) Foreign Application Priority Data

Feb. 1, 2022   (JP) ................ 2022-014092

(51) Int. Cl.
| | |
|---|---|
| C08K 3/22 | (2006.01) |
| C01G 39/00 | (2006.01) |
| C08K 9/06 | (2006.01) |
| C09C 1/00 | (2006.01) |
| C09C 3/12 | (2006.01) |

(52) U.S. Cl.
CPC ............ *C08K 9/06* (2013.01); *C01G 39/006* (2013.01); *C09C 1/0003* (2013.01); *C09C 3/12* (2013.01); *C01P 2002/72* (2013.01); *C01P 2002/74* (2013.01); *C01P 2002/82* (2013.01); *C01P 2004/61* (2013.01); *C01P 2004/62* (2013.01); *C01P 2006/12* (2013.01); *C01P 2006/40* (2013.01); *C01P 2006/80* (2013.01); *C08K 2003/2255* (2013.01); *C08K 2003/2296* (2013.01)

(58) Field of Classification Search
CPC .......... C01G 39/006; C08K 2003/2255; C08K 2003/2296
See application file for complete search history.

(56) References Cited

U.S. PATENT DOCUMENTS

| | | | |
|---|---|---|---|
| 6,190,787 B1 * | 2/2001 | Maeda | ............... H01L 23/293 523/210 |
| 9,232,648 B2 | 1/2016 | Miyahira et al. | |
| 10,414,943 B2 | 9/2019 | Takahashi et al. | |
| 2012/0276392 A1 | 11/2012 | Takahashi et al. | |
| 2014/0308489 A1 | 10/2014 | Miyahira et al. | |
| 2016/0230037 A1 | 8/2016 | Takahashi et al. | |
| 2016/0234942 A1 | 8/2016 | Takahashi et al. | |
| 2018/0094162 A1 | 4/2018 | Takahashi et al. | |

FOREIGN PATENT DOCUMENTS

| | | |
|---|---|---|
| CN | 103827038 A | 5/2014 |
| JP | 2005082668 A | 3/2005 |
| JP | 2011137054 A | 7/2011 |
| JP | 6595137 B1 | 10/2019 |
| JP | 2020138880 A | 9/2020 |
| JP | 2021066641 A | 4/2021 |
| TW | I697518 B | 7/2020 |
| WO | WO-2013047203 A1 | 4/2013 |

OTHER PUBLICATIONS

International Preliminary Report on Patentability issued Jul. 28, 2023 in PCT/JP2022/008048 (with English translation), 13 pages.
International Search Report issued Apr. 19, 2022 in PCT/JP2022/008048 (with English translation), 7 pages.
Written Opinion issued Apr. 19, 2022 in PCT/JP2022/008048 (with English translation), 10 pages.
Office Action issued Dec. 5, 2024, in corresponding Korean Patent Application No. 10-2024-7026385 (with machine English translation), 15 pages.
Combined Taiwanese Office Action and Search Report issued Oct. 2, 2025, in corresponding Taiwanese Patent Application No. 111115461 (with machine English translation), 12 pages.

* cited by examiner

*Primary Examiner* — Vickey Nerangis
(74) *Attorney, Agent, or Firm* — Element IP, PLC

(57) ABSTRACT

An object of the present invention is to provide a composite oxide particle material formed of zinc molybdate having a high purity and a high circularity. The composite oxide particle material is formed of a composite oxide, of molybdenum and zinc, having an average particle diameter of 0.1 μm or more and 5.0 μm or less, a BET specific surface area of 1 m$^2$/g or more and 20 m$^2$/g or less, (peak intensity at 26.6° according to XRD)/(peak intensity at 24.2°) of 1.20 or more, an impurity concentration of 1 mass % or less, and a circularity of 0.90 or more. XRD is measured with CuKα radiation.

16 Claims, 1 Drawing Sheet

COMPOSITE OXIDE PARTICLE MATERIAL, METHOD FOR PRODUCING SAME, FILLER, FILLER-CONTAINING SLURRY COMPOSITION, AND FILLER-CONTAINING RESIN COMPOSITION

TECHNICAL FIELD

The present invention relates to a composite oxide particle material that contains molybdenum and zinc, a method for producing the same, a filler, a filler-containing slurry composition, and a filler-containing resin composition.

BACKGROUND ART

In association with advancement in high frequency and high speed of a semiconductor device, reduction of permittivity and the dielectric loss tangent of a material forming the semiconductor device is required.

For example, while silica or alumina is mainly used as a filler forming a semiconductor device, zinc molybdate may be used in combination as a flame retardant additive or for improvement of processability. However, the permittivity and the dielectric loss tangent of zinc molybdate are high, and thus are required to be suppressed at a lower level.

As methods for producing zinc molybdate, a method in which a sodium molybdate aqueous solution and zinc chloride are mixed to be reacted, thereby synthesizing zinc molybdate, and a method in which molybdenum oxide and zinc oxide are heated in water to be reacted, thereby synthesizing zinc molybdate, are known.

Here, when fillability as a filler is taken into consideration, a filler that is spherical is suitable. However, zinc molybdate produced by a wet synthesis method has a low circularity. A method (VMC method) in which metal particles are put in a high temperature oxidizing atmosphere, to be oxidized is a production method appropriate for producing a spherical particle material, and a method for producing zinc molybdate is also disclosed (Patent Literature 1).

CITATION LIST

Patent Literature

Patent Literature 1: JP2005-082668 (A)

SUMMARY OF INVENTION

Technical Problem

However, the method according to Patent Literature 1 has a large content of unreacted raw materials and by-products (molybdenum oxide, zinc oxide), and is not appropriate for actual use.

The present invention has been completed in view of the above circumstances. An object of the present invention is to provide a composite oxide particle material formed of zinc molybdate having a high purity and a high circularity, and a method for producing the same. Further, an object of the present invention is to provide a filler, a filler-containing slurry composition, and a filler-containing resin composition which contain the composite oxide particle material.

Solution to Problem

In order to solve the above problem, the present inventors conducted thorough studies. As a result, the present inventors found that when zinc molybdate has a crystal structure in which peak intensity at 26.6° according to XRD/peak intensity at 24.2° is 1.20 or more, the permittivity and the dielectric loss tangent are reduced, and the present inventors obtained findings that, in order to realize the crystal structure, adopting the VMC method and increasing the amount of oxygen subjected to the reaction are effective. The present inventors found that, as a result of improvement of the VMC method, peak intensity at 26.6° according to XRD/peak intensity at 24.2° is made 1.20 or more, and in addition, the amount of unreacted matters and side reaction products is reduced. Thus, the present inventors completed the present invention.

That is, a composite oxide particle material of the present invention solving the above problem is formed of a composite oxide, of molybdenum and zinc, having an average particle diameter of 0.1 μm or more and 5.0 μm or less, a BET specific surface area of 1 $m^2/g$ or more and 20 $m^2/g$ or less, (peak intensity at 26.6° according to XRD)/(peak intensity at 24.2°) of 1.20 or more, an impurity concentration of 1 mass % or less, and a circularity of 0.90 or more. XRD is measured with CuKα radiation.

Preferably, the relative permittivity is 16 or less. In addition, preferably, (dielectric loss tangent)/(BET specific surface area ($m^2$)) is 0.0030 or less. Further, preferably, the composite oxide particle material has been subjected to surface treatment with an organosilicon compound.

A method for producing the composite oxide particle material of the present invention solving the above problem is a method for producing the composite oxide particle material of the present invention including: a particle raw material preparation step of preparing a particle raw material of one or more types containing metal molybdenum and metal zinc as a whole; and a composite oxide particle material production step of producing the composite oxide particle material by continuously putting the particle raw material in a state of being dispersed in a carrier into flame in an oxidizing atmosphere, to burn the particle raw material.

In particular, preferably, a ratio (R/T) between: an oxygen amount R per unit time to be introduced into the oxidizing atmosphere; and an oxygen amount T per unit time necessary for completely oxidizing the particle raw material and a combustible gas is 1.2 or more.

A filler of the present invention solving the above problem is a filler to be used for an electronic material resin composition and including the composite oxide particle material of the present invention. In particular, the filler may contain another inorganic particle material.

A filler-containing slurry composition of the present invention solving the above problem includes: the filler of the present invention; and a dispersion medium in which the filler is dispersed.

A filler-containing resin composition of the present invention solving the above problem includes: the filler of the present invention; and a resin material in which the filler is dispersed.

Advantageous Effects of Invention

Since the composite oxide particle material of the present invention has the above components, a composite oxide particle material formed of zinc molybdate having a low value of permittivity/dielectric loss tangent, good electric characteristics, and a small amount of impurities is provided.

DESCRIPTION OF EMBODIMENTS

Figure 1:
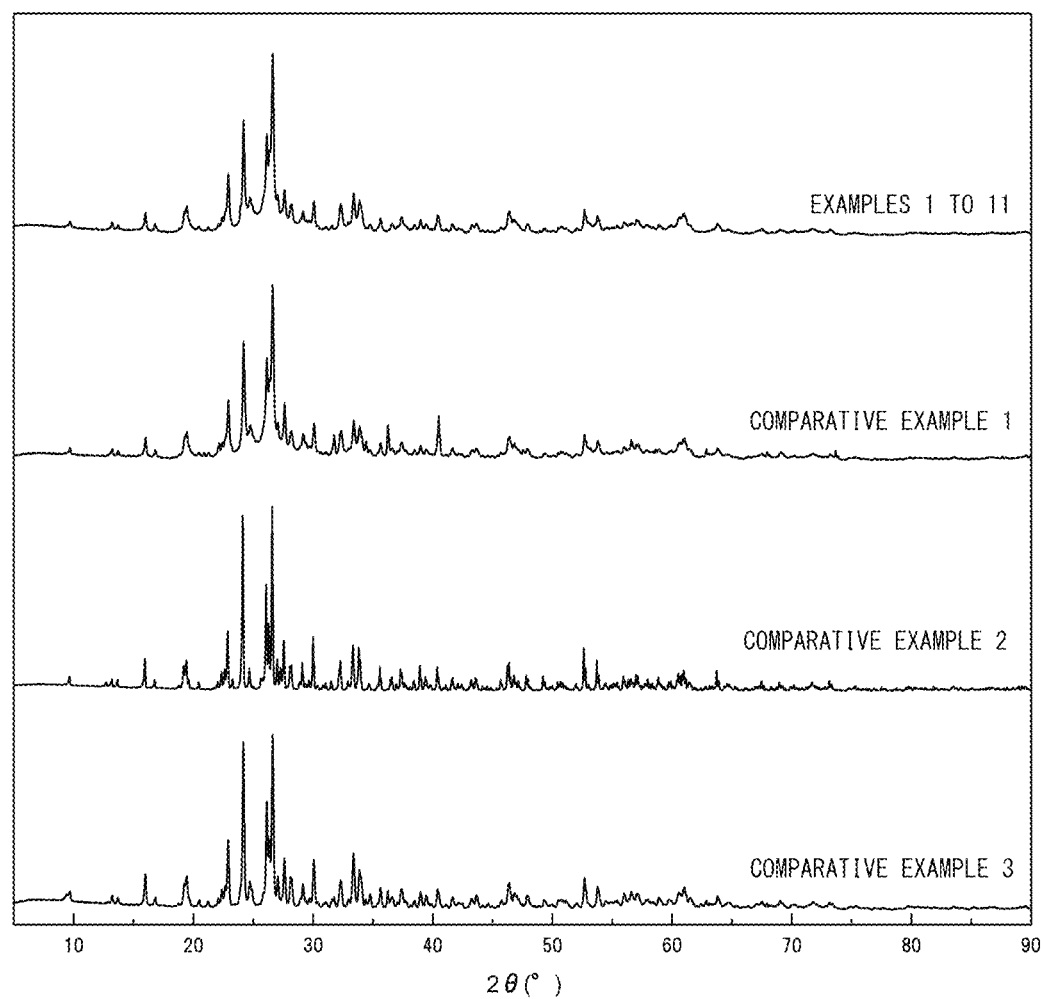
FIG. 1 is XRD charts of test samples of Examples and Comparative Examples.

A composite oxide particle material of the present invention and a method for producing the same will be described in detail with reference to an embodiment below. The composite oxide particle material of the present embodiment is a particle material formed of zinc molybdate being a composite oxide of molybdenum and zinc, and may be used as a part or the entirety of a filler to be contained in a resin composition to be used for a sealing material, an underfill, a substrate material, or the like for a semiconductor. When used by being mixed with another material, the composite oxide particle material may be used together with a silica particle material, an alumina particle material, or the like.

(Composite Oxide Particle Material)

The composite particle material of the present embodiment is formed of zinc molybdate, and has a content of impurities of 1 mass % or less. Impurities refer to unreacted metal molybdenum and unreacted metal zinc, and molybdenum oxide and zinc oxide respectively generated by molybdenum and zinc being singly oxidized, and the amounts thereof are calculated on the basis of a calibration curve obtained through XRD measurement of a powder in which the mixing ratio of zinc molybdate, molybdenum oxide, zinc oxide, molybdenum, and zinc is changed.

The composite oxide particle material of the present embodiment has a crystal structure in which (peak intensity at 26.6° according to XRD)/(peak intensity at 24.2°) is 1.20 or more, and examples of the lower limit value thereof include 1.22, 1.24, 1.26, 1.28, and 1.30.

As a method for calculating a peak intensity from an XRD chart, a straight line connecting the intensity at a diffraction angle $2\theta$ of 18° and the intensity at the diffraction angle $2\theta$ of 45° is set as a baseline, and the heights of the position at 26.6° and the position at 24.2° are respectively defined as the peak intensities thereof.

The composite oxide particle material of the present embodiment has an average particle diameter of 0.1 μm or more and 5.0 μm or less, examples of the lower limit value thereof include 0.15 μm, 0.20 μm, 0.25 μm, and 0.30 μm, and examples of the upper limit value thereof include 4.5 μm, 4.0 μm, 3.5 μm, and 3.0 μm. These lower limit values and upper limit values may be combined as desired. The average particle diameter in the present description is an equivalent circle diameter. Specifically, an average value obtained by measuring 100 or more particles with use of image processing software (Asahi Kasei Engineering Corporation: A-zou-kun) is adopted.

The composite oxide particle material of the present embodiment has a circularity of 0.90 or more, and examples of the lower limit value thereof include 0.95, 0.98, 0.99, and 1.00. The circularity is calculated as a value calculated by (circularity)=$\{4\pi \times (area) \div (perimeter)^2\}$ based on an area and a perimeter of the particle observed when a photograph is taken by an SEM. The closer the value is to 1, the closer the particle is to a complete sphere. Specifically, an average value obtained by measuring 100 or more particles with use of image processing software (Asahi Kasei Engineering Corporation: A-zou-kun) is adopted.

The composite oxide particle material of the present embodiment has a BET specific surface area, measured using nitrogen, of 1 $m^2/g$ or more and 20 $m^2/g$ or less, examples of the lower limit value thereof include 1.5 $m^2/g$, 2.0 $m^2/g$, and 2.5 $m^2/g$, and examples of the upper limit value thereof include 18 $m^2/g$, 16 $m^2/g$, and 14 $m^2/g$. These lower limit values and upper limit values may be combined as desired.

The composite oxide particle material of the present embodiment preferably has a relative permittivity of 16 or less, and examples of the upper limit value thereof include 15.8, 15.5, 15.3, and 15.0. In commercially available zinc molybdate or zinc molybdate synthesized by a wet synthesis method, the relative permittivity shows a value of about more than 16 and 18 or less.

A lower value of a dielectric loss tangent (Df) is preferable. For example, Df/(BET specific surface area) is preferably 0.0030 or less, and examples of the upper limit value thereof include 0.0028, 0.0026, 0.0024, 0.0022, and 0.0020.

Preferably, the composite oxide particle material of the present embodiment has been subjected to surface treatment with an organosilicon compound. As the organosilicon compound, a silane compound or a silazane is preferably adopted, and examples of the silane compound include those having a phenyl group, an alkyl group, a vinyl group, a methacrylic group, an epoxy group, a phenylamino group, an amino group, a styryl group, or the like. Since OH groups present on the surface often react, the residual amount of OH groups is preferably 2/$nm^2$ or less and more preferably 1/$nm^2$ or less.

(Method for Producing Composite Oxide Particle Material)

The method for producing the composite oxide particle material of the present embodiment is a method with which the composite oxide particle material of the present embodiment is appropriately produced. Specifically, the method includes a particle raw material preparation step, a composite oxide particle material production step, and other steps selected as necessary.

The particle raw material preparation step is a step of preparing a particle raw material of one or more types containing metal molybdenum and metal zinc as a whole.

The particle raw material that is prepared may be formed of a material of one type, or may be formed of particle materials of two or more types having different compositions. That the particle raw material contains metal molybdenum and metal zinc as a whole means that, when the particle raw material formed of a particle material of one, or two or more types is analyzed as a whole, the particle raw material contains metal molybdenum and metal zinc. For example, the particle raw material may be a mixture of a particle material formed of metal molybdenum and a particle material formed of metal zinc, or may be a particle material formed of an alloy of molybdenum and zinc. In particular, desirably, the particle raw material contains metal molybdenum and metal zinc at high purities. The particle raw material may be subjected to surface treatment with an organosilicon compound described above. Surface treatment improves a dispersion state in a carrier described later or prevents aggregation.

The particle diameter of the particle raw material varies depending on the particle diameter of the composite oxide particle material to be produced, but may be made about 1 μm to 30 μm. Making the particle diameter of the particle raw material small is preferable since oxidation reaction tends to be easily caused. However, if the particle diameter is too small, suppliability tends to be deteriorated.

The method for preparing the particle raw material is not limited in particular. For example, metal molybdenum and metal zinc may be made into particles through an atomizing process, grinding, or the like. In particular, a method using a disc atomizer is preferable.

A composite oxide particle material production step is a step of producing the composite oxide particle material by putting the particle raw material into flame in an oxidizing atmosphere. When a particle raw material putting condition and a flame generation condition are set such that a composite oxide particle material has the average particle diameter, the BET specific surface area, and the XRD chart as in the composite oxide particle material of the present embodiment described above, unreacted matters are inhibited from remaining, the amount of side reaction products is also reduced, and the relative permittivity and the dielectric loss tangent of the composite oxide particle material that is obtained are reduced.

With respect to the composite oxide particle material that is obtained, making the average particle diameter large is achieved by increasing the raw material concentration in the oxidizing atmosphere. Conversely, making the average particle diameter small is achieved by reducing the raw material concentration in the oxidizing atmosphere. In particular, when the amount of oxygen to be introduced into the oxidizing atmosphere described later is increased relative to a theoretically necessary amount, an excellent composite oxide particle material is produced.

The particle raw material is put into flame in a state where the particle raw material is dispersed in a carrier. Examples of the carrier include gas and liquid, examples of the gas include air, nitrogen, oxygen, and argon, and examples of the liquid include water and alcohols such as isopropanol.

When the particle raw material is put into flame, oxygen is simultaneously put into the oxidizing atmosphere. Putting oxygen into the oxidizing atmosphere may be performed by using oxygen as a part or the entirety of the carrier or by introducing oxygen in a flow independent of that of the carrier. As for the introduction of oxygen, oxygen may be singly introduced, or may be introduced together with nitrogen (including the case of introducing air) or another inert gas. Preferably, the oxidizing atmosphere is formed in a furnace or the like that is tightly closed to some extent so that the oxygen amount to be introduced and the temperature of the flame are precisely controlled.

A ratio (R/T) between: an actual introduction amount R per unit time of oxygen into the oxidizing atmosphere; and an oxygen amount T that is theoretically necessary in order to completely oxidize a combustible gas and the particle raw material to be introduced into flame per unit time is preferably 1.2 or more. When the oxygen amount is a sufficiently excessive amount relative to the theoretically necessary oxygen amount, a crystal structure in which (peak intensity at 26.6° according to XRD)/(peak intensity at 24.2°) is 1.20 or more is formed. In addition, unreacted matters are inhibited from remaining, and further, the amount of side reaction products is also reduced.

The composite oxide particle material having been obtained may be subjected to the surface treatment described with respect to the composite oxide particle material of the present embodiment described above. The surface treatment may be performed: by bringing a surface treatment agent, as is, into contact with the surface of the composite oxide particle material; by bringing a surface treatment agent in a state of being dissolved or dispersed in an appropriate solvent (a solvent, such as isopropanol or methyl ethyl ketone (MEK), that allows the composite oxide particle material to be dispersed therein), into contact with the surface of the composite oxide particle material; or by bringing a surface treatment agent in a state of being vaporized, into contact with the surface of the composite oxide particle material. Reaction of the surface treatment agent may be promoted by performing, for example, heating after bringing the surface treatment agent into contact with the surface.

The amount of the surface treatment agent is not limited in particular, and any amount may be selected from an amount smaller than the amount corresponding to OH groups present on the surface of the composite oxide particle material immediately after being prepared in the composite oxide particle material production step, to an excessive amount.

As for the amount of the surface treatment agent, examples of the lower limit value of the organosilicon compound amount per unit surface area ($m^2$) calculated by using the BET specific surface area after the surface treatment include 0.2 $\mu mol/m^2$, 0.3 $\mu mol/m^2$, and 0.4 $\mu mol/m^2$, and examples of the upper limit value include 20 $\mu mol/m^2$, 18 $\mu mol/m^2$, and 16 $\mu mol/m^2$. These lower limit values and upper limit values may be combined as desired.

(Filler, Filler-Containing Slurry, and Filler-Containing Resin Composition)

The filler of the present embodiment is a filler to be used for an electronic material resin composition and has the composite oxide particle material of the present embodiment described above. Further, the filler may contain an inorganic particle material as necessary. Examples of the inorganic particle material include a silica particle material and an alumina particle material. The electronic material resin composition may be used for a sealing material, an underfill, a substrate material, or the like for a semiconductor device.

The filler-containing slurry of the present embodiment is a slurry obtained by dispersing this filler in a dispersion medium. The dispersion medium is not limited in particular as long as the dispersion medium is a liquid, and examples thereof include organic solvents such as MEK, and resin material precursors (resin precursors such as monomers and prepolymers). The content proportion of the filler is not limited in particular, and preferably, is made large within a range where the fluidity of the slurry is maintained.

The filler-containing resin composition of the present embodiment is a composition obtained by dispersing this filler in a resin material. The resin material is not limited in particular and may be in a liquid state or a solid state.

The resin material that may be adopted is not limited in particular, and an ordinary resin material such as a thermoplastic resin or a thermosetting resin may be selected. Examples thereof include epoxy resin, polyimide, polycarbonate, polyethylene terephthalate, polybutylene terephthalate, polymethyl methacrylate, polyvinyl chloride, polypropylene, polyethylene, and polyphenylene ether.

The method for dispersing the particle material in the resin material is not limited in particular. For example, when a thermoplastic resin is adopted as the resin material, a heated and melted resin material and the particle material are mixed and kneaded, or a resin precursor and the particle material are mixed and then polymerized, whereby a resin composition is obtained. When the resin material is a thermosetting resin, a resin precursor and the particle material are mixed and then hardened. A composition in which a resin precursor in a liquid state is adopted as the resin material is also the filler-containing resin composition of the present embodiment.

EXAMPLES

Hereinafter, the composite oxide particle material of the present invention will be described in detail on the basis of Examples.

<Preparation of Test Sample>

Examples 1 to 7 and Comparative Example 1
(Produced by a VMC Method)

A metal molybdenum powder having an average particle diameter of 3 μm and a purity of 99.9% or more, and a metal zinc powder having an average particle diameter of 30 μm and a purity of 99% or more were mixed at a mole ratio of molybdenum:zinc=1:1, to prepare a particle raw material (the particle raw material preparation step).

This particle raw material was put into oxidizing flame in an oxidizing atmosphere formed in a reaction furnace. The particle raw material was put to be dispersed so as to have a concentration of 4 kg/m$^3$ in air serving as a carrier, and was burned, to obtain a composite oxide particle material being a test sample of the corresponding Example formed of a composite oxide (zinc molybdate) of molybdenum and zinc (the composite oxide particle material production step).

At this time, air was put into the reaction furnace such that the ratio (R/T) between: the oxygen amount (put-in $O_2$ amount R) actually put in; and the oxygen amount (theoretical $O_2$ amount T) necessary for completely oxidizing a combustible gas and the particle raw material to be put in has the value shown in Table 1.

Example 8

Figure 2:
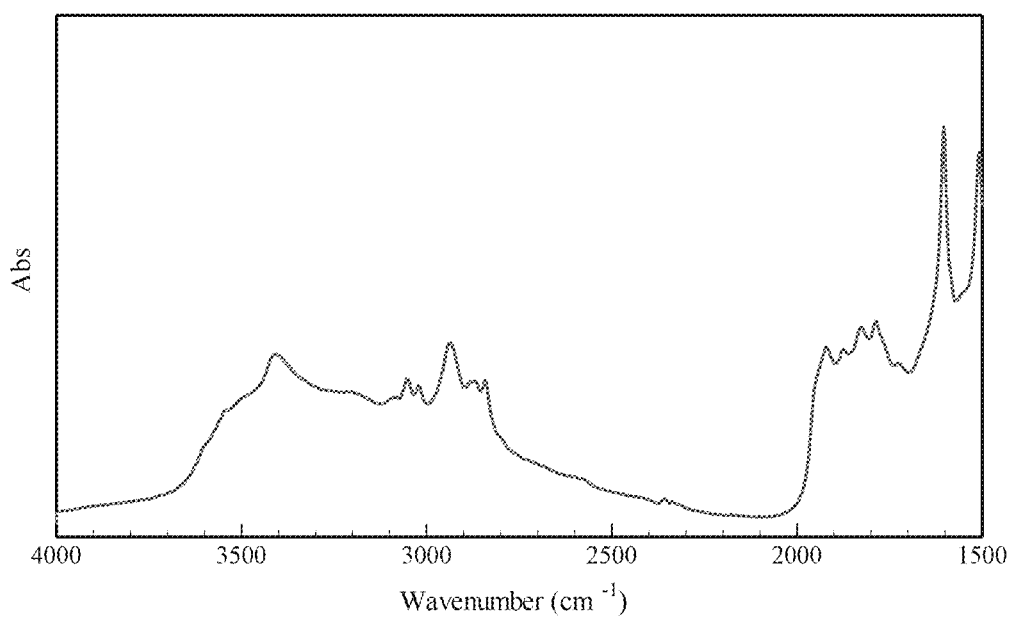
FIG. 2 is an IR spectrum of Example 8.

The test sample obtained in Example 3 was subjected to surface treatment with phenylaminosilane (KBM-573) as a surface treatment agent, to obtain a test sample of the present Example. The surface treatment amount was set to be 10 μmol per unit surface area (m$^2$) measured in terms of the BET specific surface area. The surface treatment was confirmed on the basis of an IR spectrum. Specifically, phenylaminosilane was confirmed to be bound to the surface, by confirming the presence of a peak of phenylaminosilane-derived C—H stretching vibration near 2940 cm$^{-1}$. An IR spectrum example is shown in FIG. 2.

Example 9

A test sample of the present Example was obtained by performing the same operation as in Example 8 except that the test sample of Example 4 was used instead of the test sample of Example 3.

Example 10

A test sample of the present Example was obtained by performing the same operation as in Example 8 except that vinylsilane (KBM-1003) was used as the surface treatment agent, instead of phenylaminosilane.

Example 11

A test sample of the present Example was obtained by performing the same operation as in Example 8 except that methacrylic silane (KBM-503) was used as the surface treatment agent, instead of phenylaminosilane.

Comparative Example 2

A commercially available reagent (manufactured by Mitsuwa Chemicals Co., Ltd.) was used as a test sample of the present Comparative Example.

Comparative Example 3

A composite oxide particle material was produced by a wet synthesis method and used as a test sample of the present Comparative Example. Specifically, synthesizing operation was performed as below. First, 10.3 g of molybdenum oxide (manufactured by KISHIDA CHEMICAL Co., Ltd.) was added to 500 g of ion exchanged water, and the resultant matter was heated and stirred at 80° C. 5.8 g of zinc oxide (manufactured by KISHIDA CHEMICAL Co., Ltd.) was added thereto, and the resultant matter was stirred for 4 hours. Then, solid-liquid separation was performed and the solid content was dried. Then, the solid content was fired at 550° C. for 8 hours, to obtain a composite oxide particle material formed of zinc molybdate.

<Evaluation>

The equivalent circle diameter, the specific surface area, the circularity, the unreacted matter amount and the by-product amount, the relative permittivity, the dielectric loss tangent, dielectric loss tangent/specific surface area, (peak intensity at 26.6° according to XRD)/(peak intensity at 24.2°), and put-in $O_2$ amount/theoretical $O_2$ amount were each measured or calculated. Table 1 shows the results. For reference, XRD charts of the test samples of Examples and Comparative Examples are shown in FIG. 1.

Relative Permittivity, Dielectric Loss Tangent

Using a network analyzer (manufactured by Keysight Technologies, Inc., E5071C) and a cavity resonator perturbation method, the relative permittivity at 1 GHz was measured. This measurement was performed according to ASTM D2520 (JIS C2565).

Unreacted Matter Amount and by-Product Amount

Mixed powders in which the blending ratio of zinc molybdate, molybdenum oxide, zinc oxide, metal molybdenum, and metal zinc were varied were adjusted, XRDs were measured, and diffraction intensity at a diffraction angle (2θ) derived from each substance was read from the obtained charts, whereby a calibration curve was created. Using the created calibration curve, the content of unreacted matters and by-products contained in the test sample of each of Examples and Comparative Examples was calculated.

For zinc molybdate, the value of a peak near 270 was used; for molybdenum oxide, the value of a peak near 230 was used; for zinc oxide, the value of a peak near 32° was used; for metal molybdenum, the value of a peak near 40° was used; and for metal zinc, the value of a peak near 43' was used.

TABLE 1

| | Example 1 | Example 2 | Example 3 | Example 4 | Example 5 | Example 6 | Example 7 | Example 8 |
|---|---|---|---|---|---|---|---|---|
| Equivalent circle diameter (μm) | 0.6 | 0.6 | 0.7 | 0.4 | 0.4 | 0.6 | 0.9 | 0.7 |
| Specific surface area (m$^2$/g) | 3.4 | 3.1 | 3.1 | 6.7 | 6.0 | 4.8 | 3.3 | 3.1 |

TABLE 1-continued

| | | | | | | | | |
|---|---|---|---|---|---|---|---|---|
| Circularity | 0.97 | 0.98 | 0.98 | 0.98 | 0.97 | 0.99 | 0.98 | 0.98 |
| Unreacted matter + by-product (%) | 0.4 | 0.2 | 0.1 | 0.2 | 0.3 | 0.0 | 0.2 | 0.1 |
| Relative permittivity | 12.7 | 12.7 | 12.6 | 13.5 | 14.2 | 12.9 | 13.6 | 14.4 |
| Dielectric loss tangent | 0.0044 | 0.0042 | 0.0037 | 0.0069 | 0.0070 | 0.0049 | 0.0041 | 0.0032 |
| Dielectric loss tangent/specific surface area | 0.0013 | 0.0013 | 0.0012 | 0.0010 | 0.0012 | 0.0010 | 0.0012 | 0.0010 |
| Peak intensity at 26.6°/peak intensity at 24.2° | 1.41 | 1.39 | 1.36 | 1.39 | 1.35 | 1.54 | 1.48 | 1.36 |
| Put-in $O_2$ amount/theoretical $O_2$ amount | 1.5 | 1.7 | 1.8 | 1.4 | 1.5 | 1.2 | 1.9 | 1.8 |

| | Example 9 | Example 10 | Example 11 | Comparative Example 1 | Comparative Example 2 | Comparative Example 3 |
|---|---|---|---|---|---|---|
| Equivalent circle diameter (μm) | 0.4 | 0.7 | 0.7 | 0.8 | 31.6 | 1.2 |
| Specific surface area (m²/g) | 6.7 | 3.1 | 3.1 | 3.3 | 0.8 | 3.7 |
| Circularity | 0.98 | 0.98 | 0.98 | 0.98 | 0.10 | 0.51 |
| Unreacted matter + by-product (%) | 0.2 | 0.1 | 0.1 | 5.6 | — | — |
| Relative permittivity | 14.8 | 14.3 | 14.5 | 14.8 | 16.1 | 17.3 |
| Dielectric loss tangent | 0.0036 | 0.0028 | 0.0036 | 0.0068 | 0.0027 | 0.0117 |
| Dielectric loss tangent/specific surface area | 0.0005 | 0.0009 | 0.0012 | 0.0021 | 0.0034 | 0.0032 |
| Peak intensity at 26.6°/peak intensity at 24.2° | 1.39 | 1.36 | 1.36 | 1.44 | 1.05 | 1.05 |
| Put-in $O_2$ amount/theoretical $O_2$ amount | 1.4 | 1.8 | 1.8 | 1.1 | — | — |

As is clear from the table, the test samples of Examples 1 to 11 and Comparative Example 1 produced by the VMC method were found to have high circularities. In addition, Examples 1 to 11 were found to have high purities (the amount of unreacted matters and side reaction products is small).

Further, in the test samples of Examples 1 to 11 and Comparative Example 1 in which (peak intensity at 26.6° according to XRD)/(peak intensity at 24.2°) was 1.20 or more, the relative permittivity was 16 or less, and dielectric loss tangent/specific surface area was 0.0030 or less. Thus, the test samples of Examples 1 to 11 and Comparative Example 1 were found to be excellent in electric characteristics.

Examples 1 to 11 in which put-in $O_2$ amount/theoretical $O_2$ amount was 1.2 or more were found to have clearly smaller amounts of unreacted matters and side reaction products than Comparative Example 1 in which put-in $O_2$ amount/theoretical $O_2$ amount was 1.1, which was low, and were found to have small dielectric loss tangent/specific surface area as well. Here, the amount of unreacted matters and side reaction products may include an error of about 0.1 to 0.2%, but the value of 5.6% of Comparative Example 1 is clearly larger than the values of Examples 1 to 11. In the test samples of Comparative Examples 2 and 3, the circularity was low and, in addition, dielectric loss tangent/specific surface area was large.

Therefore, when (peak intensity at 26.6° according to XRD)/(peak intensity at 24.2°) is 1.20 or more, electric characteristics were found to be excellent and the amount of unreacted matters and side reaction products was also found to be small. When such a composite oxide particle material is to be prepared, setting put-in $O_2$ amount/theoretical $O_2$ amount to be 1.2 or more was found to be effective.

The invention claimed is:

1. A composite oxide particle material formed of a composite oxide of molybdenum and zinc, the composite oxide particle material having
an average particle diameter of 0.1 μm or more and 5.0 μm or less,
a BET specific surface area of 1 $m^2$/g or more and 20 $m^2$/g or less, and
an impurity concentration, which is a concentration of metal molybdenum, metal zinc, molybdenum oxide and/or zinc oxide, of 1 mass % or less and a circularity of 0.90 or more,
wherein the composite oxide particle material is produced by the method comprising continuously putting a particle raw material comprising metal molybdenum and metal zinc in a state of being dispersed in a carrier into flame in an oxidizing atmosphere, to burn the particle raw material, wherein a ratio (R/T) between: an oxygen amount R per unit time to be introduced into the oxidizing atmosphere; and an oxygen amount T per unit time necessary for completely oxidizing the particle raw material and a combustible gas is 1.2 or more.

2. The composite oxide particle material according to claim 1, having a relative permittivity of 16 or less.

3. The composite oxide particle material according to claim 1, having (dielectric loss tangent)/(BET specific surface area ($m^2$)) of 0.0030 or less.

4. The composite oxide particle material according to claim 1, having (peak intensity at 26.6° according to XRD)/(peak intensity at) 24.2° of 1.20 or more.

5. The composite oxide particle material according to claim 1, having been subjected to surface treatment with an organosilicon compound.

6. The composite oxide particle material according to claim 1, wherein the composite oxide particle has the average particle diameter of 0.20 μm or more and 4.0 μm or less.

7. The composite oxide particle material according to claim 1, wherein the composite oxide particle has the average particle diameter of 0.30 μm or more and 3.0 μm or less.

8. The composite oxide particle material according to claim 1, wherein the composite oxide particle has the BET specific surface area of 2.0 $m^2$/g or more and 16 $m^2$/g or less.

9. The composite oxide particle material according to claim 1, wherein the composite oxide particle has the BET specific surface area of 2.5 $m^2$/g or more and 14 $m^2$/g or less.

10. The composite oxide particle material according to claim 1, wherein the composite oxide particle has the circularity of 0.95 or more.

11. The composite oxide particle material according to claim 1, wherein the composite oxide particle has the circularity of 0.99 or more.

12. A filler to be used for an electronic material resin composition and comprising the composite oxide particle material according to claim 1.

13. The filler according to claim 12, comprising another inorganic particle material.

14. A filler-containing slurry composition comprising:
the filler according to claim 12; and
a dispersion medium in which the filler is dispersed.

15. A filler-containing resin composition comprising:
the filler according to claim 12; and
a resin material in which the filler is dispersed.

16. A production method for producing the composite oxide particle material according to claim 1, the production method comprising:
continuously putting a particle raw material comprising metal molybdenum and metal zinc in a state of being dispersed in a carrier into flame in an oxidizing atmosphere, to burn the particle raw material, wherein
a ratio (R/T) between: an oxygen amount R per unit time to be introduced into the oxidizing atmosphere; and an oxygen amount T per unit time necessary for completely oxidizing the particle raw material and a combustible gas is 1.2 or more.

* * * * *